(12) United States Patent
Xie

(10) Patent No.: US 9,622,065 B2
(45) Date of Patent: Apr. 11, 2017

(54) METHOD FOR SEARCHING FOR A DEVICE AND TERMINAL DEVICE

(71) Applicant: HUIZHOU TCL MOBILE COMMUNICATION CO., LTD., Huizhou, Guangdong (CN)

(72) Inventor: Fang Xie, Huizhou (CN)

(73) Assignee: Huizhou TCL Mobile Communication Co., Ltd, Huizhou (CN)

( * ) Notice: Subject to any disclaimer, the term of this patent is extended or adjusted under 35 U.S.C. 154(b) by 0 days.

(21) Appl. No.: 14/437,560

(22) PCT Filed: Apr. 10, 2014

(86) PCT No.: PCT/CN2014/075072
§ 371 (c)(1),
(2) Date: Apr. 22, 2015

(87) PCT Pub. No.: WO2015/074368
PCT Pub. Date: May 28, 2015

(65) Prior Publication Data
US 2016/0021524 A1    Jan. 21, 2016

(30) Foreign Application Priority Data
Nov. 19, 2013 (CN) .......................... 2013 1 0582974

(51) Int. Cl.
*H04W 76/00* (2009.01)
*H04W 8/00* (2009.01)
(Continued)

(52) U.S. Cl.
CPC ............ *H04W 8/005* (2013.01); *H04B 7/026* (2013.01); *H04W 64/00* (2013.01); *H04W 76/00* (2013.01); *H04W 76/02* (2013.01)

(58) Field of Classification Search
CPC ...... H04B 7/026; H04W 64/00; H04W 76/00; H04W 76/02; H04W 8/005
See application file for complete search history.

(56) References Cited

U.S. PATENT DOCUMENTS

2006/0046709 A1\* 3/2006 Krumm .............. H04N 21/4126
455/422.1
2012/0322466 A1  12/2012 Das et al.

FOREIGN PATENT DOCUMENTS

CN     1715951 A    1/2006
CN     1805395 A    7/2006
(Continued)

OTHER PUBLICATIONS

English Abstract of CN103595449 A, Feb. 19, 2014.
(Continued)

*Primary Examiner* — Ping Hsieh
(74) *Attorney, Agent, or Firm* — Ladas & Parry LLP

(57) ABSTRACT

A method for searching for a device and a terminal device are provided. The method comprises the following steps of: transmitting a ranging signal by a terminal device to the outside, receiving pieces of feedback information provided by nearby devices in response to the ranging signal by the terminal device; generating a searching result list according to the feedback information by the terminal device, and arranging all the nearby devices of the searching result list in an ascending order of the distances between the terminal device and the nearby devices; and displaying the searching result list on the terminal device. Thereby, the present disclosure allows a user to quickly find a target device with which he or she needs to establish a connection.

9 Claims, 3 Drawing Sheets

(51) Int. Cl.
    *H04B 7/026*     (2017.01)
    *H04W 64/00*     (2009.01)
    *H04W 76/02*     (2009.01)

(56) References Cited

FOREIGN PATENT DOCUMENTS

| | | |
|---|---|---|
| CN | 101682529 A | 3/2010 |
| CN | 102037747 A | 4/2011 |
| CN | 102547031 A | 7/2012 |
| CN | 102685927 A | 9/2012 |
| CN | 101390408 A | 12/2012 |
| CN | 103595449 A | 2/2014 |

OTHER PUBLICATIONS

English Abstract of CN102037747 A, Apr. 27, 2011.
English Abstract of CN101682529 A, Mar. 24, 2010.
English Abstract of CNI02547031 A, Jul. 4, 2012.
English Abstract of CN1715951 A, Jan. 4, 2006.
English Abstract of CN102685927 A, Sep. 19, 2012.
English Abstract of CN1805395 A, Jul. 19, 2006.
English Abstract of CN101390408 A, Dec. 20, 2012.

\* cited by examiner

METHOD FOR SEARCHING FOR A DEVICE AND TERMINAL DEVICE

RELATED APPLICATION

This application is a national phase entry under 35 USC 371 International Patent Application No PCT/CN2014/075072 filed on Apr. 10, 2014, which claims priority from Chinese Patent Application No. 2013105829740 filed on Nov. 19, 2013, the disclosures of which are incorporated in their entirety by reference herein.

FIELD OF THE INVENTION

The present disclosure generally relates to the technical field of communications, and more particularly, to a method for searching for a device and to a terminal device.

BACKGROUND OF THE INVENTION

As compared with the conventional wired electrical connections, Bluetooth and WIFI allow electronic apparatuses to wirelessly connect with each other. This eliminates the need of using the conventional wires, and allows for information sharing anywhere and at any time, which makes it convenient to use the electronic apparatuses. Therefore, in order to satisfy the consumers' needs, the Bluetooth and WIFI functions have become essential configurations of most terminal devices.

When establishing a wireless connection, both the Bluetooth function and the WIFI function have to search for an available device, transmit a connection request, and get an acknowledgement from the counterpart device before information transmission can be done. The transmission distance is typically 10 meters for the class2 Bluetooth and may reach up to 100 meters for the class1 Bluetooth; and the transmission distance of WIFI varies with the transmitting power, and is generally 20~300 meters. Therefore, when a connection request is transmitted by the Bluetooth or WIFI function, all available devices within the searching radius (i.e., the maximum transmission distance) will be displayed, and particularly in areas with a high building density or in densely populated areas, the number of devices that can be found through searching is huge. This makes it difficult for the user to find the device with which he or she needs to establish a connection among the numerous devices.

SUMMARY OF THE INVENTION

The main technical problem to be solved by the present disclosure is to provide a method for searching for a device and a terminal device, which allow the user to quickly find a target device with which he or she needs to establish a connection.

To solve the aforesaid technical problem, a technical solution adopted by the present disclosure is to provide a method for searching for a device, which comprises: transmitting a ranging signal by a terminal device to the outside; receiving pieces of feedback information provided by nearby devices in response to the ranging signal by the terminal device; generating a searching result list according to the feedback information by the terminal device; for each of the pieces of feedback, information, acquiring a distance value between the terminal device and a corresponding one of the nearby devices according to a transmitting time at, which the ranging signal is transmitted and a receiving time at which the feedback information is received; arranging all distance values in an ascending order; arranging all the nearby devices of the searching result list in an ascending order of the distances between the terminal device and the nearby devices according to an arrangement order of all the distance values; and displaying the searching result list on the terminal device; wherein the step of transmitting a ranging signal by a terminal device to the outside comprises: transmitting an electromagnetic wave by the terminal device to the outside.

Preferably, the step of for each of the pieces of feedback information, acquiring a distance value between the terminal device and a corresponding one of the nearby devices corresponding to the feedback information according to a transmitting time at which the ranging signal is transmitted and a receiving time at which the feedback information is received, comprises: each time one of the pieces of feedback information is received, acquiring the distance value between the terminal device and a nearby device corresponding to the piece of feedback information by the terminal device according to the receiving time of the piece of feedback information.

Preferably, the step of arranging all distance values in an ascending order, comprises: each time the distance value between the terminal device and one of the nearby devices is acquired, comparing the acquired distance value with other distance values and re-arranging all the distance values in an ascending order according to the comparison result by the terminal device.

Preferably, the terminal device detects whether the searching result list has been updated at regular intervals; if it is detected that the searching result, list, has been re-arranged, then the terminal device displays the re-arranged searching result list; and if it is detected that the searching result list has not been updated, then the terminal device displays the original searching result list.

Preferably, each of the pieces of feedback information fed back by the nearby devices carry a piece of device information of one corresponding nearby device, which comprises an MAC address and a device name of the corresponding nearby device.

To solve the aforesaid technical problem, another technical solution adopted by the present disclosure is to provide a method for searching for a device, which comprises: transmitting a ranging signal by a terminal device to the outside; receiving pieces of feedback information provided by nearby devices in response to the ranging signal by the terminal device; generating a searching result list according to the feedback information and arranging all the nearby devices of the searching result list in an ascending order of the distances between the terminal device and the nearby devices by the terminal device; and displaying the searching result list on the terminal device.

Preferably, the step of arranging all the nearby devices of the searching result list in an ascending order of the distances between the terminal device and the nearby devices, comprises: for each of the pieces of feedback information, acquiring a distance value between the terminal device and a corresponding one of the nearby devices according to a transmitting time at which the ranging signal is transmitted and a receiving time at which the feedback information is received; arranging the distance values in an ascending order; arranging all the nearby devices of the searching result list in an ascending order of the distances between the terminal device and the nearby devices according to an arrangement order of all the distance values.

Preferably, the step of for each of the pieces of feedback information, acquiring a distance value between the terminal device and a corresponding one of the nearby devices according to a transmitting time at which the ranging signal is transmitted and a receiving time at which the feedback information is received, comprises: each time one of the pieces of feedback information is received, acquiring the distance value between the terminal device and a nearby device corresponding to the piece of feedback information by the terminal device according to the receiving time of the piece of feedback information.

Preferably, the step of arranging all distance values in an ascending order, comprises: each time the distance value between the terminal device and one of the nearby devices is acquired, comparing the acquired distance value with other distance values and re-arranging all the distance values in an ascending order according to the comparison result by the terminal device.

Preferably, the terminal device detects whether the searching result list has been updated at regular intervals; if it is detected that the searching result list has been re-arranged, then the terminal device displays the re-arranged searching result list; and if it is detected that the searching result list has not been updated, then the terminal device displays the original searching result list.

Preferably, the step of arranging all the nearby devices of the searching result list in an ascending order of the distances between the terminal device and the nearby devices comprises: according to a chronological order of times at which the pieces of feedback information are received respectively, arranging all the nearby devices of the searching result list in the chronological order of the times, so that all the nearby devices in the searching result list are arranged in an ascending order of the distances between the terminal device and the nearby devices.

Preferably, the step of transmitting a ranging signal by a terminal device to the outside comprises: transmitting an electromagnetic wave by the terminal device to the outside.

Preferably, each of the pieces of feedback information fed back by the nearby devices carry a piece of device information of one corresponding nearby device, which comprises an MAC address and a device name of the corresponding nearby device.

To solve the aforesaid technical problem, a further technical solution adopted by the present disclosure is to provide a terminal device, which comprises: a transmitting module, being configured to transmit a ranging signal to the outside; a receiving module, being configured to receive pieces of feedback information provided by nearby devices in response to the ranging signal; a generating module, being configured to generate a searching result list according to the feedback information and arrange all the nearby devices of the searching result list in an ascending order of the distances between the terminal device and the nearby devices; and a displaying module, being configured to display the searching result list.

Preferably, the generating module comprises: an acquiring unit, being configured to, for each of the pieces of feedback information, acquire a distance value between the terminal device and a corresponding one of the nearby devices according to a transmitting time at which the ranging signal is transmitted and a receiving time at which the feedback information is received; an arranging unit, being configured to arrange all distance values in an ascending order, and arrange all the nearby devices of the searching result list in an ascending order of the distances between the terminal device and the nearby devices according to an arrangement order of all the distance values.

Preferably, the acquiring unit is configured to, each time one of the pieces of feedback information is received, acquire the distance value between the terminal device and the nearby device corresponding to the piece of feedback information according to the receiving time of the piece of feedback information; the arranging unit is configured to, each time the distance value between the terminal device and one of the nearby devices is acquired, compare the acquired distance value with other distance values and re-arrange all the distance values in an ascending order according to the comparison result.

Preferably, the generating module is configured to, according to a chronological order of times at which the pieces of feedback information are received respectively, arrange all the nearby devices of the searching result list in the chronological order of the times so that all the nearby devices in the searching result list are arranged in an ascending order of the distances between the terminal device and the nearby devices.

Preferably, the transmitting module is configured to transmit an electromagnetic wave to the outside.

The present, disclosure has the following benefits: the method for searching for a device of the present disclosure differs from, the prior art in that, a terminal device transmits a ranging signal to the outside, generates a searching result list according to pieces of feedback information fed back by nearby devices in response to the ranging signal, arranges all the devices of the searching result, list, in an ascending order of distances between the terminal device and the devices and displays the searching result list to the user. This allows the user to quickly find nearby devices and quickly find a target device with which he or she needs to establish a connection.

DETAILED DESCRIPTION OF THE INVENTION

Hereinbelow, the present disclosure will be detailed with reference to the drawings and the embodiments thereof.

Figure 1:
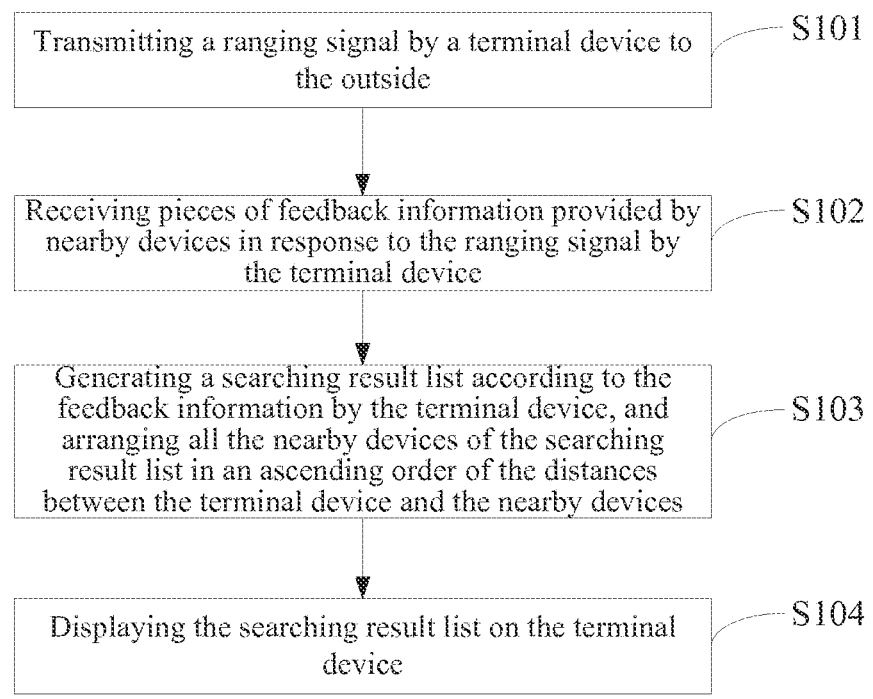
FIG. 1 is a flowchart diagram of an embodiment of a method for searching for a device according to the present disclosure.

In an embodiment of a method for searching for a device according to the present disclosure shown in FIG. 1, the device searched for is a Bluetooth device, and a terminal device is also a Bluetooth device. When the terminal device needs to perform a data transmission with other devices through the Bluetooth, the terminal device will firstly initiate a Bluetooth call request to search for available Bluetooth devices. The terminal device continuously displays the Bluetooth devices obtained through searching to a user during the searching process so that the user can find a Bluetooth device, with which he or she needs to establish a connection, from all the Bluetooth devices obtained through searching. Of course, in other embodiments, the device searched for may also be a WIFI device, in which case the terminal device transmits a WIFI connection request and performs the data transmission through the WIFI. This embodiment allows the user to quickly find the Bluetooth device that he or she needs. Specifically, the method for searching for a device comprises the following steps of:

Step S101: transmitting a ranging signal by a terminal device to the outside.

There are many methods for measuring distances, such as laser distance measurement, radio electromagnetic distance measurement or the like. This embodiment uses the commonly used electromagnetic distance measurement method to measure distances between the terminal device and nearby devices. The electromagnetic distance measurement uses the electromagnetic wave as the carrier wave. After being modulated, the electromagnetic wave is transmitted form one end of a survey line and then reflected or sent back from the other end of the survey line, and then the distance is measured by measuring the duration between the time at which the electromagnetic wave is transmitted and the time at which the echo wave is received. When transmitting the Bluetooth call request, the terminal device also transmits an electromagnetic wave ranging signal at the same time.

Step S102: receiving pieces of feedback information provided by nearby devices in response to the ranging signal by the terminal device.

The nearby devices refer to available Bluetooth devices within the maximum transmission distance of the terminal device. After the electromagnetic wave ranging signal is transmitted by the terminal device to the outside, nearby devices that have received the electromagnetic wave will reflect or send back the electromagnetic wave to the terminal device; and each of the electronic waves fed back by the nearby devices to the terminal device carries a piece of device information (e.g., the MAC address, the device name and etc.) of the corresponding nearby device so that the terminal device can know which device each of the pieces of feedback information that are received is from.

Step S103: generating a searching result list according to the feedback information by the terminal device, and arranging all the nearby devices of the searching result list in an ascending order of the distances between the terminal device and the nearby devices.

The terminal device generates a searching result according to the pieces of information that are received, records all the devices obtained through searching into a list (e.g., records the device name of each of the devices obtained through searching to form the searching result list), and arranges all the devices in the searching result list in an ascending order of the distances between the terminal device and the devices, that is, arranges the nearby device closest to the terminal device to be the first one in the searching result list, and then arranges the other devices in an ascending order of the distances.

Step S304: displaying the searching result list on the terminal device.

The terminal device displays the searching result list to the user to display the nearby devices obtained through searching to the user. The Bluetooth function generally only supports short-distance transmission. Therefore, when the user performs the data transmission with other devices through the Bluetooth function, the target device with which he or she needs to connect is usually located close to the user and has a short distance from the user. Accordingly, this embodiment arranges all the nearby devices obtained through searching in an ascending order of the distances between the terminal device and the nearby devices, and displays the arrangement result to the user in the form of a list so that the user can quickly find the target device with which he or she needs to connect. Generally speaking, the first three ones in the searching result list generally include the target device with which the user needs to connect.

Figure 2:
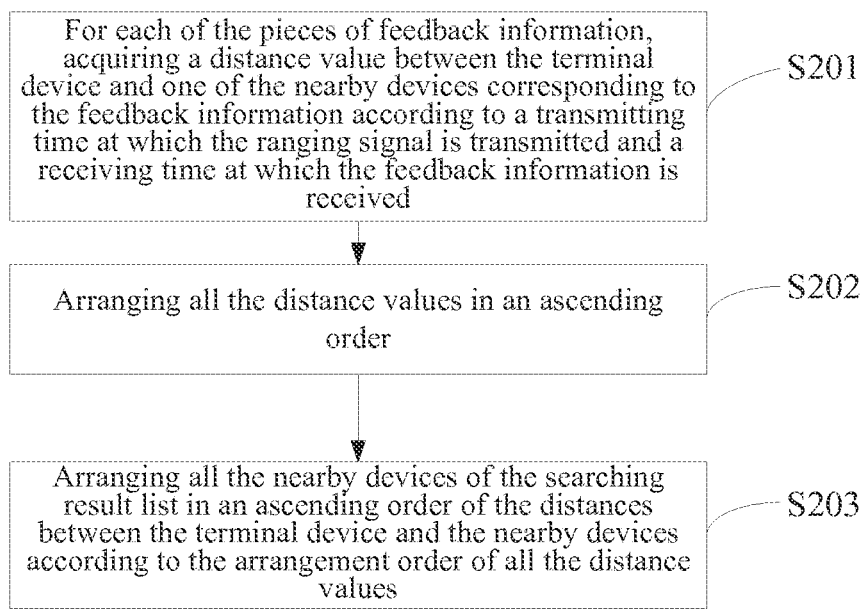
FIG. 2 is a flowchart diagram of the step of arranging all nearby devices of a searching result list in an ascending order of the distances between a terminal device and the nearby devices in the method for searching for a device in FIG. 1.

More specifically, referring to FIG. 2, this embodiment arranges all the nearby devices in an ascending order of the distances between the terminal device and the nearby devices. The step of arranging all the nearby devices of the searching result list in an ascending order of the distances between the terminal device and the nearby devices specifically comprises:

Step S201: for each of the pieces of feedback information, acquiring a distance value between the terminal device and a corresponding one of the nearby devices according to a transmitting time at which the ranging signal is transmitted and a receiving time at which the feedback information is received.

After the electromagnetic wave ranging signal is transmitted by the terminal device to the outside, the terminal device receives the pieces of feedback information provided by the nearby devices in response to the electromagnetic wave ranging signal. For each of the pieces of feedback information, the terminal device calculates a time interval between the transmitting time at which the electromagnetic wave ranging signal is transmitted and the receiving time at which the feedback information is received so that the distance value between the terminal device and the corresponding one of the nearby devices corresponding to the feedback information can be obtained through calculation.

Step S202: arranging all distance values in an ascending order.

Step S203: arranging all the nearby devices of the searching result list in an ascending order of the distances between the terminal device and the nearby devices according to an arrangement order of all the distance values.

Each of the pieces of feedback information fed back by the nearby devices will carry a piece of device information. The terminal device extracts device identification from each of the pieces of feedback information that are received, and then synchronizes each of the distance values acquired with the corresponding device identification. For example, this may be achieved through the following program:

```
Typedef
{
*pMAC,
Int Distance,
*pName,
......
} BTdevice;
``` where, the pAMC address is used to record the MAC address of the nearby device, which is the identification information that, can be used to identify a nearby device. The Distance refers to the distance between the nearby device and the terminal device, and the pName is configured to record the name of the nearby device. Each distance value is in one-to-one correspondence with its corresponding nearby device, and the nearby device corresponding to each of the distance values can be identified according to the distance value obtained through calculation. Therefore, all the nearby devices of the searching result list are also correspondingly arranged according to the arrangement order of all the distance values so that the nearby devices can be arranged in an ascending order of the distances between the terminal device and the nearby devices. For example, the smallest distance value is arranged to be the first one while the greatest distance value is arranged to be the last one; and correspondingly, the nearby device corresponding to the smallest distance value is also arranged to be the first one in the searching result list while the nearby device corresponding to the greatest distance value is also arranged to be the last one in the searching result list.

Furthermore, in order to improve the user's experiences, increase the displaying speed and allow the user to find the target device with which he or she needs to establish a connection as quickly as possible, this embodiment further displays the nearby devices obtained through searching to the user in real time. Specifically, each time one of the pieces of feedback information is received by the terminal device, the terminal device acquires the distance value between the terminal device and a nearby device corresponding to the piece of feedback information according to the receiving time of the piece of feedback information. That is, the terminal device does not calculate the distance values until all the pieces of feedback information are received, but calculates the distance value each time one of the pieces of information is received. Additionally, each time the distance value between the terminal device and one of the nearby devices is acquired by the terminal device, the terminal device compares the acquired distance value with other distance values and re-arranges all the distance values in an ascending order according to the comparison result.

In the aforesaid way, as soon as one of the pieces of feedback information is received by the terminal device, the terminal device calculates the distance value according to the receiving time at which the feedback information is received and the transmitting time at which the ranging signal is transmitted, and then compares the distance value with other distance values and re-arranges all the distance values according to the comparison result so that all the nearby devices of the searching result, list are also re-arranged according to a new arrangement order of all the distance values. Once a new device is obtained through searching, the new device will transmit a piece of feedback information to the terminal device. Then, the terminal device calculates a distance value between the new device and the terminal device according to the feedback information thereof, compares the distance value with other distance values to re-arrange all the distance values including the distance value between the new device and the terminal device in an ascending order so that all the nearby devices including the new device of the searching result list are re-arranged in an ascending order of the distances, and a new searching result list is displayed.

Accordingly, once a new nearby device is obtained through searching, the terminal device will calculate a distance value between the new device and the terminal device, and compare the distance value obtained through calculation with other distance values to re-arrange the order of all the distance values so that the arrangement order of ail the nearby devices of the searching result list will be re-arranged. The terminal device displays the re-arranged searching result list to the user. For example, the terminal device may detect whether the searching result list has been updated at regular intervals (e.g., every 0.2 second); and if it is detected that the searching result list has been re-arranged, then the terminal device displays the re-arranged searching result list, and if it is detected that the searching result list has not been updated, then the terminal device displays the original searching result list. Therefore, the arrangement order of all the devices of the searching result list will change with the changes of the arrangement order of all the distance values. In this way, the terminal device may display the device obtained through searching to the user in real time so that the user can quickly find the target device that he or she needs. Also, the terminal device calculates the distance values between the terminal device and the nearby devices to arrange the nearby devices in an ascending order of the distances, which can improve the accuracy.

In another embodiment of the method for searching for a device of the present disclosure, it is also possible that all the nearby devices in the searching result list are arranged according to the chronological order of times at which the pieces of feedback information are received respectively so that all the nearby devices of the searching result list are arranged in an ascending order of the distances between the terminal device and the nearby devices. Generally speaking, the shorter the distance is, the sooner the feedback information will be received by the terminal device. In this embodiment, the terminal device also arranges the corresponding devices in a chronological order of times according to the chronological order of the times at which the pieces of feedback information are received respectively. Specifically, at the very moment when a first piece of feedback information is received by the terminal device, only one device (i.e., the device corresponding to the feedback information) that is obtained through searching appears in the searching result list, and the device corresponding to the feedback information is arranged to be the first one in the searching result list, which is displayed by the terminal device. After a second piece of feedback information is received by the terminal device, the device corresponding to the second piece of feedback information is arranged after the previous device, that is, is arranged to be the second one in the searching result list, and so on. The terminal device sequentially displays the devices corresponding to the pieces of feedback information successively received to the user until the device obtained last through searching is displayed. Thus, a searching result list in which the devices are arranged in an ascending order of the distances is obtained. Therefore, the user can find the target device with which he or she needs to establish a connection as quickly as possible to facilitate quick searching of the user.

Figure 3:
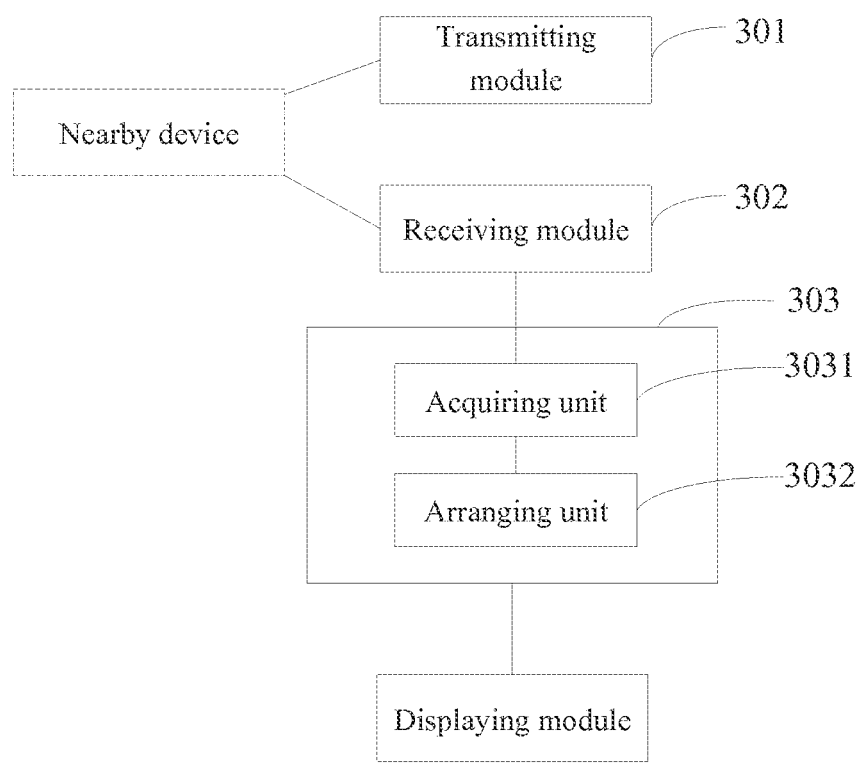
FIG. 3 is a schematic structural view of an embodiment of a terminal device of the present disclosure.

Referring to FIG. 3, an embodiment of a terminal device of the present disclosure allows the user to quickly find a target object with which he or she needs to establish a connection when the terminal device needs to perform a Bluetooth communication with other devices. Specifically, the terminal device comprises a transmitting module 301, a receiving module 302, a generating module 303 and a displaying module 304. Specifically, the transmitting module 301 is configured to transmit a ranging signal to the outside. The ranging signal may be, for example, an electromagnetic wave, and of course may also be other radio signals. The receiving module 302 is configured to receive pieces of feedback information provided by nearby devices 305 in response to the ranging signal; and each of the pieces of feedback information carries the device information (e.g., the MAC address and etc.) of the corresponding device so that the terminal device can know which nearby device each of the pieces of feedback information received is from. The generating module 303 is configured to generate a searching result list according to the feedback information and arrange all the nearby devices of the searching result list in an ascending order of the distances between the terminal device and the nearby devices. The displaying module 304 is configured to display the searching result list.

When the terminal device needs to perform a Bluetooth communication with other devices, the counterpart devices are generally located close to the terminal device. Therefore, this embodiment arranges the nearby devices obtained through searching in an ascending order of distances and displays the result to the user so that the user can quickly find the device closest to him or her and thus find the target Bluetooth device with which the user needs to establish a connection.

More specifically, in this embodiment, the generating module 303 comprises an acquiring unit 3031 and an arranging unit 3032. The acquiring unit 3031 is configured to, for each of the pieces of feedback information, acquire a distance value between the terminal device and one of the nearby devices corresponding to the feedback information according to a transmitting time at which the ranging signal is transmitted and a receiving time at which the feedback information is received, and the arranging unit 3032 is configured to arrange all the distance values acquired by the acquiring unit 3031 in an ascending order, and arrange all the nearby devices of the searching result list in an ascending order of the distances between the terminal device and the nearby devices according to the arrangement order of all the distance values. Furthermore, in order to improve the user's experiences and allow the user to find the target device that he or she needs as quickly as possible, each time one of the pieces of feedback information is received by the receiving module 302, the acquiring unit 3031 acquires the distance value between the terminal device and the nearby device corresponding to the feedback information according to the receiving time of the feedback information; and each time a distance value between the terminal device and one of the nearby devices is acquired by the acquiring unit 3031, the arranging unit 3032 compares the acquired distance value with other distance values and re-arranges all the distance values in an ascending order according to the comparison result so that all the devices in the searching result list can also be re-arranged in an ascending order of the distances according to the arrangement order of all the distance values. The displaying module 304 displays the re-arranged searching result list. Thereby, once a new device is obtained by the terminal device through searching, the terminal device will update the searching result list so that the user can quickly find the target device that he or she needs.

Generally speaking, the shorter the distance is, the sooner the feedback information will be received by the terminal device. Therefore, in another embodiment of a terminal device of the present disclosure, it is also possible that the distances between the terminal device and the nearby devices are not calculated. Instead, all the nearby devices in the searching result list are arranged in a corresponding chronological order of times according to the chronological order of times at which all the pieces of feedback information are received by the receiving module so that all the nearby devices in the searching result list are arranged in an ascending order of the distances between the terminal device and the nearby devices.

Furthermore, it is apparent to those skilled in the art, the present disclosure also provides a terminal device, which comprises a non-transitory program storage medium and a processor. The non-transitory program storage medium stores a program executed by the processor to perform the method as described in above. Furthermore, it is apparent to those skilled in the art that, various modules 301, 302, 303 and various units 3031, 3032 of the terminal device as shown in FIG. 3 are software modules or software units. In another aspect, it is well-known that various software modules and various software units inherently are stored in the non-transitory program storage medium and executed by the processor to perform the related functions respectively.

What described above are only the embodiments of the present disclosure, but are not intended to limit the scope of the present, disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A method for searching for a device, comprising:
   transmitting a ranging signal by a terminal device to the outside;
   receiving pieces of feedback information provided by nearby devices in response to the ranging signal by the terminal device;
   generating a searching result list according to the feedback information by the terminal device;
   for each of the pieces of feedback information, acquiring a distance value between the terminal device and a corresponding one of the nearby devices according to a transmitting time at which the ranging signal is transmitted and a receiving time at which the feedback information is received;
   arranging all distance values in an ascending order;
   arranging all the nearby devices of the searching result list in an ascending order of the distances between the terminal device and the nearby devices according to an arrangement order of all the distance values; and
   displaying the searching result list on the terminal device;
   wherein the step of transmitting a ranging signal by a terminal device to the outside comprises: transmitting an electromagnetic wave by the terminal device to the outside;
   wherein the step of each of the pieces of feedback information, acquiring the distance value between the terminal device and the corresponding one of the nearby devices according to the transmitting time at which the ranging signal is transmitted and the receiving time at which the feedback information is received, comprises: each time one of the pieces of feedback information is received, acquiring the distance value between the terminal device and a nearby device corresponding to the piece of feedback information by the terminal device according to the receiving time of the piece of feedback information; and
   the step of arranging all distance values in an ascending order, comprises: each time the distance value between the terminal device and one of the nearby devices is acquired, comparing the acquired distance value with other distance values and re-arranging all the distance values in an ascending order according to the comparison result by the terminal device.

2. The method of claim 1, wherein the terminal device detects whether the searching result list has been updated at regular intervals; if it is detected that the searching result list has been re-arranged, then, the terminal device displays the re-arranged searching result list; and if it is detected that the searching result list has not been updated, then the terminal device displays the original searching result list.

3. The method of claim 1, wherein each of the pieces of feedback information fed back by the nearby devices carry a piece of device information of one corresponding nearby device, which comprises an MAC address and a device name of the corresponding nearby device.

4. A method for searching for a device, comprising:
   transmitting a ranging signal by a terminal device to the outside;

receiving pieces of feedback information provided by nearby devices in response to the ranging signal by the terminal device;

generating a searching result list according to the feedback information and arranging all the nearby devices of the searching result list in an ascending order of the distances between the terminal device and the nearby devices by the terminal device; and displaying the searching result, list on the terminal device;

wherein the step of arranging all the nearby devices of the searching result list in the ascending order of the distances between the terminal device and the nearby devices, comprises:

according to a chronological order of times at which the pieces of feedback information are received respectively, arranging all the nearby devices of the searching result list in the chronological order of the times, so that all the nearby devices in the searching result list are arranged in an ascending order of the distances between the terminal device and the nearby devices;

wherein the step of arranging all distance values in an ascending order, comprises: each time the distance value between the terminal device and one of the nearby devices is acquired, comparing the acquired distance value with other distance values and re-arranging all the distance values in an ascending order according to the comparison result by the terminal device.

5. The method of claim 4, wherein:
the step of transmitting the ranging signal by the terminal device to the outside comprises: transmitting an electromagnetic wave by the terminal device to the outside.

6. The method of claim 4, wherein the terminal device detects whether the searching result list has been updated at regular intervals; if it is detected that the searching result list has been re-arranged, then the terminal device displays the re-arranged searching result list; and if it is detected that the searching result list has not been updated, then the terminal device displays the original searching result list.

7. The method of claim 4, wherein each of the pieces of feedback information fed back by the nearby devices carry a piece of device information of one corresponding nearby device, which comprises an MAC address and a device name of the corresponding nearby device.

8. A terminal device, comprising:
a transmitting module, being configured to transmit a ranging signal to the outside;
a receiving module, being configured to receive pieces of feedback information provided by nearby devices in response to the ranging signal;
a generating module, being configured to generate a searching result list according to the feedback information and arrange all the nearby devices of the searching result list in an ascending order of the distances between the terminal device and the nearby devices; and
a displaying module, being configured to display the searching result list;
wherein the generating module comprises:
an acquiring unit, being configured to, for each of the pieces of feedback information, acquire a distance value between the terminal device and a corresponding one of the nearby devices according to a transmitting time at which the ranging signal is transmitted and a receiving time at which the feedback information is received;
an arranging unit, being configured to arrange all distance values in an ascending order, and arrange all the nearby devices of the searching result list in an ascending order of the distances between the terminal device and the nearby devices according to an arrangement order of all the distance values;
wherein the acquiring unit is further configured to, each time one of the pieces of feedback information is received, acquire the distance value between the terminal device and a nearby device corresponding to the piece of feedback information according to the receiving time of the piece of feedback information; and the arranging unit is further configured to, each time of the distance value between the terminal device and one of the nearby devices is acquired, compare the acquired distance value with other distance values and re-arrange all the distance values in an ascending order according to the comparison result.

9. The terminal device of claim 8, wherein:
the transmitting module is configured to transmit an electromagnetic wave to the outside.

* * * * *